June 10, 1924.

H. A. S. HOWARTH

VALVED OIL COLLECTING MEANS

Filed Sept. 23, 1921   3 Sheets-Sheet 3

1,496,849

Inventor
Harry A. S. Howarth
By Mauro, Cameron, Lewis & Kerkam
Attorneys

Patented June 10, 1924.

1,496,849

UNITED STATES PATENT OFFICE.

HARRY A. S. HOWARTH, OF PITTSBURGH, PENNSYLVANIA, ASSIGNOR TO ALBERT KINGSBURY, OF PHILADELPHIA, PENNSYLVANIA.

VALVED OIL-COLLECTING MEANS.

Application filed September 23, 1921. Serial No. 502,747.

*To all whom it may concern:*

Be it known that I, HARRY A. S. HOWARTH, a citizen of the United States, and a resident of Pittsburgh, Pennsylvania, have invented new and useful Improvements in Valved Oil-Collecting Means, which invention is fully set forth in the following specification.

This invention relates to bearings for horizontal or inclined shafts and, more particularly, to means whereby a circulation of oil may be maintained through the bearing under pressure, and if desired through an oil-cooling device or one or more guide bearings or both, by the coaction of oil-collecting means with an oil-carrying surface.

It has heretofore been proposed in the application of Albert Kingsbury, Sr. No. 416,186, filed October 11, 1920, to provide a thrust bearing for horizontal or inclined shafts with one or more oil-retaining chambers in which the bearing members are disposed, and to maintain said bearing members immersed in oil when the bearing is in operation by keeping said chamber or chambers full of oil that is directed thereinto by oil-collecting means cooperating with a rotatable oil-carrying surface, said oil-collecting means being so related to said oil-carrying surface and to said chamber or chambers that a pressure is maintained on the oil in the latter, whereby a more rapid circulation of oil can be obtained or the pressure utilized to secure a circulation of the oil through an oil-cooling device or one or more guide bearings or both.

It is an object of this invention to provide a bearing for horizontal or inclined shafts of the type just characterized with valved oil-collecting means whereby the space around the oil-carrying surface at the rear of the oil-collecting means may be shut off from the space around said surface at the forward or oil-collecting side of said means, and a pressure maintained on the oil in the chamber or chambers into which it is directed, in whichever direction said oil-carrying surface may rotate.

Another object of this invention is to provide oil-collecting means of the type just characterized with valve mechanism which is automatically operated, as by the pressure of the collected oil or the direction of movement of the oil-carrying surface or both, so that the said valve mechanism is automatically adjusted, and the oil in the chamber or chambers into which it is directed maintained under pressure, in whichever direction said oil-carrying surface may rotate.

A further object of the present invention is to provide oil-collecting means adapted to collect oil from an oil-carrying surface whether said surface rotates in one direction or the other and having valve mechanism whereby the chamber or chambers in which the bearing members are disposed are in communication with the space around the oil-carrying surface at only the forward or oil-collecting side of said means in whichever direction said oil-carrying surface may rotate.

Another object of this invention is to provide oil-collecting means of the type just characterized wherein the valve mechanism is automatically operated, as by the pressure of the collected oil or the direction of rotation of the oil-carrying surface or both.

Another object of this invention is to provide oil-collecting means which is movable by the direction of rotation of the oil-carrying surface to shut off the space around said surface at the rear of the oil-collecting means from the space around said surface at the forward or oil-collecting side of said means.

Another object of this invention is to provide oil-collecting means which is movable by the direction of rotation of the oil-carrying surface to engage one or the other of its opposite ends with said oil-carrying surface so that said means is automatically moved into proper position to collect oil from said oil-carrying surface as it rotates in one direction or the other.

Other objects will appear as the description of the invention proceeds.

Stated broadly, the invention comprises a bearing for horizontal or inclined shafts having relatively rotatable bearing members, a housing enclosing said bearing and including one or more chambers in which said bearing members are disposed, a rotatable oil-carrying surface, and valved oil-collecting means cooperating with said oil-carrying surface and adapted to collect oil therefrom and direct it to said chamber or chambers. Said oil-collecting means is preferably operative for either direction of shaft rotation and so related to said oil-carrying surface and said chamber or chambers that a pressure is maintained on the oil in the latter in whichever direction the shaft rotates. The valve mechanism associated with said oil-collecting means may be of any suitable construction, but is preferably automatically operated, by the pressure of the collected oil or the direction of rotation of the oil-carrying surface or both to shut off the space around said oil-carrying surface at the rear of the oil-collecting means from the space around said surface at the forward or oil-collecting side of said means.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to said drawings, wherein corresponding parts are designated by the same reference characters:—

Figure 1:
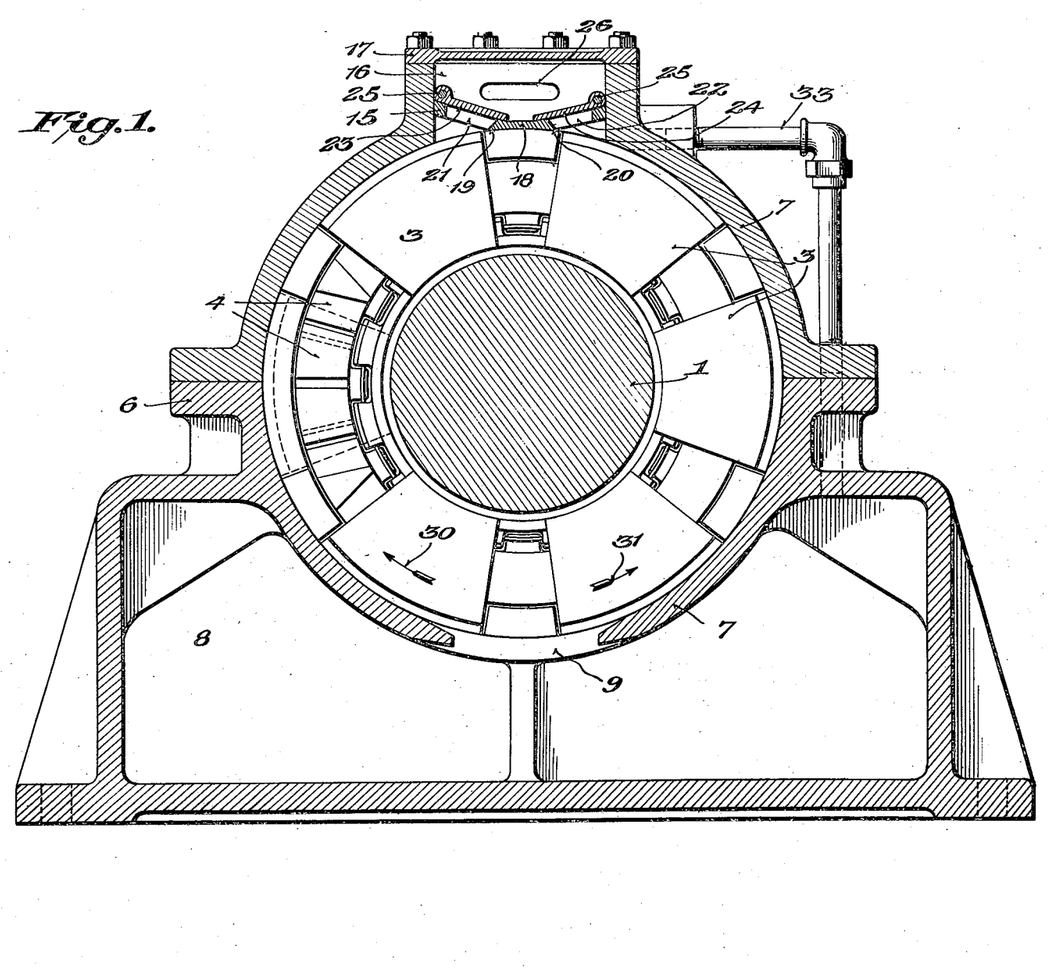
Fig. 1 is a transverse section, partly in elevation, of a thrust bearing embodying the present invention.
Figure 2:
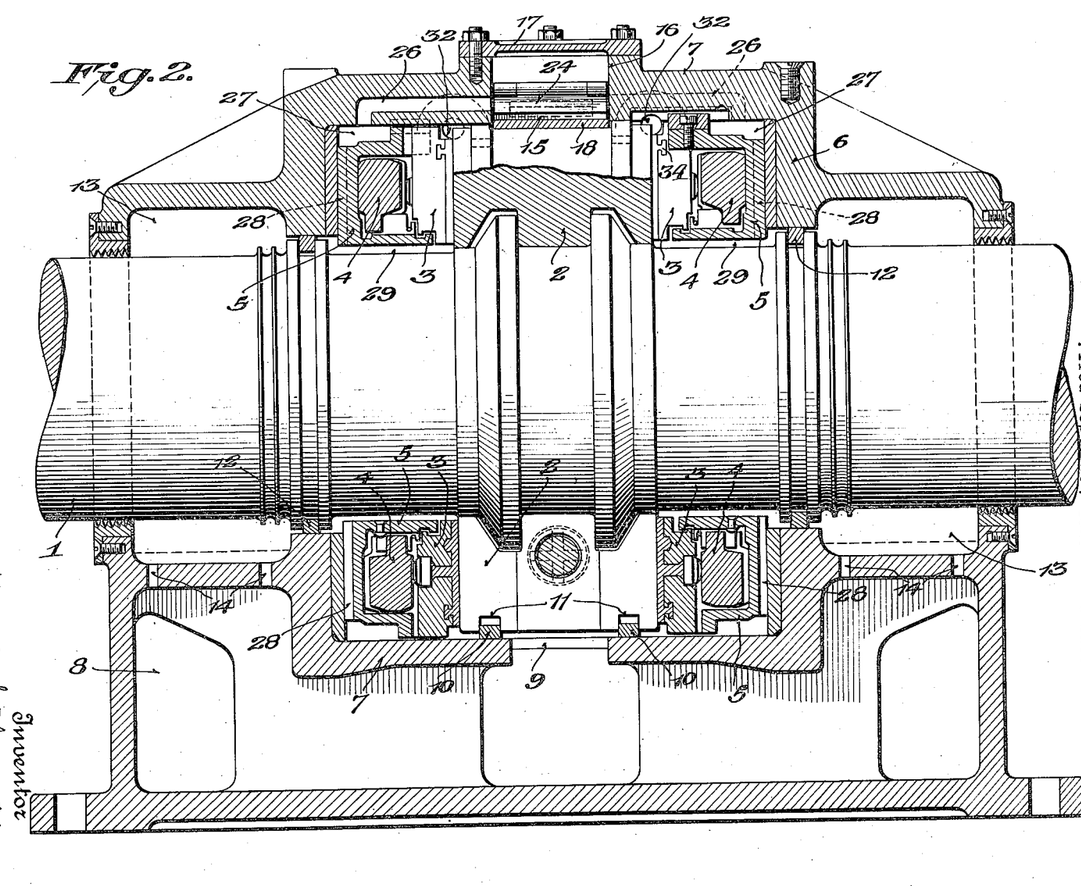
Fig. 2 is an axial section, partly in elevation, of the bearing shown in Fig. 1.

In the form shown in Figs. 1 and 2, the horizontal or inclined shaft 1 is provided, in any suitable way, with a thrust collar 2 of any suitable construction. Cooperating with one or both faces of said thrust collar 2 are bearing members of any suitable construction, shown as composed of a plurality of bearing segments or shoes 3 of any suitable construction and tiltably mounted on pressure-distributing means of any suitable construction. In the form shown, said pressure-distributing means is composed of an annular series of overlapping, tiltable equalizing plates 4, constituting a substantially-continuous but subdivided flexible ring, mounted in a channel-shaped base ring 5. As the details of construction of the bearing members and the means for mounting the same constitute no part of the present invention, further description thereof is deemed unnecessary. The bearing illustrated is shown as adapted to take thrust in either direction, but it is to be expressly understood that the present invention is not limited to such a construction and, if the bearing is to take thrust in one direction only, the bearing segments 3 will be arranged for cooperation with only one face of the thrust collar 2.

Said bearing is provided with a housing 6 which preferably includes a substantially cylindrical wall 7 that surrounds the periphery of the thrust collar 2. An oil well or reservoir 8 of any suitable construction communicates with the annular space between the periphery of the thrust collar 2 and the inner face of the cylindrical wall 7 through one or more apertures 9, said oil well being shown as provided in the base of said bearing housing. The oil level in said reservoir is preferably maintained below the level of the shaft, but at such a height that it flows through the aperture or apertures 9 and wets the lower portion of the thrust collar. Said housing also provides a chamber or chambers at one or both sides of the thrust collar 2 in which the bearing segments are disposed. In order that said chamber or chambers may be maintained full of oil when the bearing is in operation, the parts are so related or constructed in any suitable way as to restrict the flow of oil from said chamber or chambers, so that the latter in operation constitute oil-retaining chambers. In the form shown, the thrust collar 2 is provided with a sealing ring 10 adjacent each edge thereof and each ring is mounted in a suitable groove 11 formed in said collar and contacts with the inner face of the cylindrical wall 7 to separate the chambers in which said bearing members are disposed from the annular space between the periphery of said thrust collar and the inner face of said wall 7. The peripheral surface of the thrust collar 2 between the sealing rings 10 constitutes a rotatable oil-carrying surface by which oil is picked up and carried to the oil-collecting means with which the present invention is more particularly concerned. The oil-retaining chamber or chambers in which the bearing members are disposed are completed at their outer ends in any suitable way. In the form shown, a sealing ring 12 is interposed between the wall of the housing 6 and the shaft 1 in each aperture through which the shaft passes and, to catch any oil that may leak past said sealing rings, chambers 13 may be provided in said housing to collect such oil and return the same to the oil well 8 through the apertures 14.

In the embodiment of the invention shown in Figs. 1 and 2, the oil-collecting means comprises a frame 15 adapted to fit within an oil-collecting chamber 16 suitably provided in the top of the bearing housing 6 and shown as having a removable cover 17. Said frame 15 is provided with an oil-collecting portion 18 which is beveled at its opposite ends so as to provide oil-collecting edges 19 and 20. Said oil-collecting portion 18 may float on the periphery of the thrust collar or said frame 15 may be suitably supported in the chamber 16 with the oil-collecting portion 18 in close proximity to the periphery of said thrust collar. Said frame 15 is also provided with oil-admitting apertures or ports 21 and 22 adjacent the oil-collecting edges 19 and 20 respectively, and said oil-admitting apertures are controlled by valve mechanism of any suitable construction. In the form shown in Figs. 1 and 2, flat valve members 23 and 24 are suitably mounted on the frame 15, as by pintles 25, so that for either direction of shaft rotation the valve member adjacent the active edge of the oil-collecting portion 18 is opened automatically by the pressure of the collected oil, and the other valve member is automatically closed.

The oil-collecting chamber 16 is in communication with the oil-retaining chamber or chambers in which the bearing members are disposed in any suitable way. In the form shown, cored passages 26 are provided in the housing wall and lead to said oil-retaining chambers. Said passages 26 in the arrangement illustrated lead to annular chambers 27 at the rear of the base rings 5, from which the oil may flow through passages 28 in said base rings to the annular spaces 29 between said base rings and the shaft and, from the latter, flow radially outward between the bearing segments and properly lubricate the bearing surfaces of the cooperating bearing members constituted by the thrust collar 2 and the bearing segments 3. If desired, however, the passages 26 may deliver the oil adjacent the bearing surfaces and the oil flow through the chambers in the reverse direction or in any other suitable way.

In operation, assume that the thrust collar is rotating in the direction of the arrow 30 in Fig. 1. The oil flows from the oil well 8 through the aperture or apertures 9 and wets the peripheral surface of the thrust collar 2. The oil is carried upwardly on the oil-carrying surface thus provided and is collected by the oil-collecting edge 19 and deflected through the port 21 into the chamber 16, the valve member 23 opening in response to the pressure of the collected oil and the valve member 24 closing in response to the pressure of the oil admitted to said chamber 16. From said chamber 16 the oil flows through the cored passages 26, the chambers 27, the passages 28 and the annular spaces 29 until the chamber or chambers in which said bearing members are disposed are full of oil.

If, on the other hand, the shaft rotates in the direction of the arrow 31 in Fig. 1, the oil is carried upwardly by the peripheral surface of the thrust collar 2 and is collected by the oil-collecting edge 20 and deflected through the port 22 into the chamber 16, the valve member 24 opening in response to the pressure of the collected oil and the valve member 23 closing in response to the pressure of the oil admitted into said chamber 16. Again, the oil flows from the chamber 16 through the cored passages 26 into the oil-retaining chamber or chambers in which the bearing members are disposed.

Therefore, in whichever direction the oil-carrying surface may rotate the oil is collected therefrom and directed to the oil-retaining chamber or chambers, and the valve mechanism operates automatically to shut off the portion of the annular space around the oil-carrying surface at the rear of the oil-collecting means from the portion of the annular space around said surface at the forward or oil-collecting side of said means. Therefore, the oil-retaining chamber or chambers are in communication with the annular space around the oil-carrying surface only at the oil-collecting side of said oil-collecting means.

The oil adhering to the periphery of the thrust collar is backed up by said oil-collecting means in the portion of the annular space around the oil-carrying surface at the forward side of said oil-collecting means until it fills the same, and the action of the rotating collar on said body of oil, tending to rotate the same in the direction in which said collar rotates, creates a pressure in said body of oil, which pressure at the point at which the oil is removed from the oil-carrying surface is transmitted to the oil entering the chamber or chambers in which the bearing members are disposed. As said chamber or chambers are not in communication with the portion of the annular space around the oil-carrying surface at the rear of said oil-collecting means, the oil in said chamber or chambers may be maintained under this pressure, and this pressure may be utilized for causing more rapid circulation of the oil through said chamber or chambers, or for causing circulation of the oil through an oil-cooling device or one or more guide bearings or both. To this end, the oil-retaining chambers, in the construction illustrated, are provided with outlets 32 communicating with piping 33, or passages formed in the wall of the housing if preferred, through which the oil may be returned to the oil well 8, as shown, or be conveyed to an oil-cooling device or one or more guide bearings or both. In the form shown, said outlets 32 communicate with the oil-retaining chambers through the annular spaces adjacent the bearing surfaces, but if the passages 26 delivered adjacent said bearing surfaces, said outlets would preferably communicate with the annular spaces 27. Any other suitable arrangement may be employed if desired, however. To facilitate venting of the oil-retaining chambers, the keyways 34 preferably have a loose engagement with the keys on the base rings 5 so as to permit escape of air through said keyways.

In the embodiment of the invention shown in Figs. 1 and 2, the valve members 23 and 24 are separately operated by the pressure of the collected oil. If desired, however, said valve members may be connected together so that as one is opened the other is simultaneously closed. In the form shown in Figs. 3, the valve members 35 and 36 are connected together and pivoted on a pintle 37 suitably mounted in the frame 15 of the oil-collecting means, said valve members 35 and 36 bearing an angular relation to each other so that, when one valve member is moved to open its port, the other valve member is automatically and simultaneously moved to close its port.

In the embodiment of the invention shown in Figs. 1 and 2 the oil collecting means rests on the periphery of the thrust collar and is maintained in engagement with the oil-carrying surface by its own weight only. If desired, however, resilient means may be employed to assist gravity in pressing the oil-collecting means against the oil-carrying surface. In the embodiment shown in Fig. 3, a coil spring 39 is mounted between a bridge 40 on the frame 15 and the cover 17 of the chamber 16, a bolt 41 being preferably provided to center said spring, in which event said bolt may be provided with a cotter pin 42 to prevent withdrawal from the aperture in the bridge 40. The head of bolt 41 is designed to engage the inner face of the cover 17, when the latter is in position, and the spring 39 which engages said head at one end then reacts between said head and the bridge 40 to urge the oil-collecting means resiliently against the peripheral or oil-collecting surface of the thrust collar.

Figure 3:
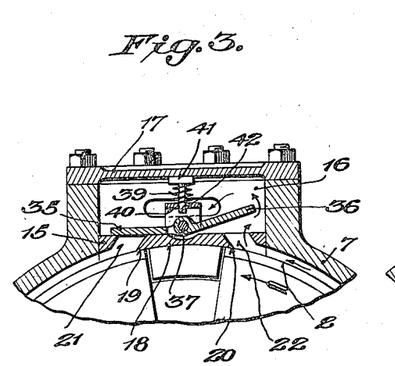
Figs. 3 to 6 are respectively fragmentary details of four other embodiments of the present invention.
Figure 4:
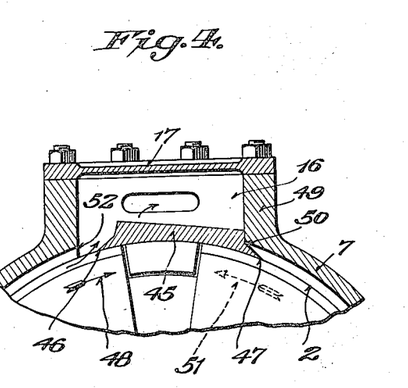

In the embodiments of the invention shown in Figs. 1 to 3 the valve mechanism is automatically operated by the pressure of the collected oil. If desired, however, the direction of rotation of the oil-carrying surface may be utilized in operating the valve mechanism automatically. In the form shown in Fig. 4, the oil-collecting means comprises an arcuate member 45 provided at its opposite ends with oil-collecting edges 46 and 47. Said member 45 floats on the periphery of the thrust collar 2 and is designed to substantially fit the chamber 16 in an axial direction; in a circumferential direction, however, said member 45 is shorter than the corresponding dimension of said chamber 16, so that said member may move through a limited distance with the thrust collar in one direction or the other when said collar starts to rotate. Thus, if the thrust collar starts to rotate in the direction of the arrow 48 (Fig. 4) the member 45 is carried by the periphery of the thrust collar until it engages the wall 49 of the chamber 16 and closes the port 50 between the chamber 16 and the portion of the annular space around the periphery of the thrust collar at the right hand side of said chamber as viewed in Fig. 4. If, however, the thrust collar rotates in the direction of the dotted arrow 51 (Fig. 4), the member 45 is carried in the opposite direction until it closes the port 52 between the chamber 16 and the portion of the annular space around the periphery of the thrust collar at the opposite side of said chamber 16. In this embodiment of the invention the oil-collecting means therefore constitutes its own valve mechanism and is moved to automatically shut off the portion of the annular space around the periphery of the thrust collar at the rear of said oil-collecting means in whichever direction the thrust collar may rotate. Moreover, it will be perceived that the oil-collecting means 45 is adapted to be moved by the pressure of the collected oil as well as by the direction of rotation of the thrust collar so that, if said member should fail to rotate with the thrust collar, the pressure of the oil collected thereby would still move the same to close the port between the chamber 16 and the portion of the annular space around the periphery of the thrust collar at the rear of said oil-collecting means.

Figure 5:
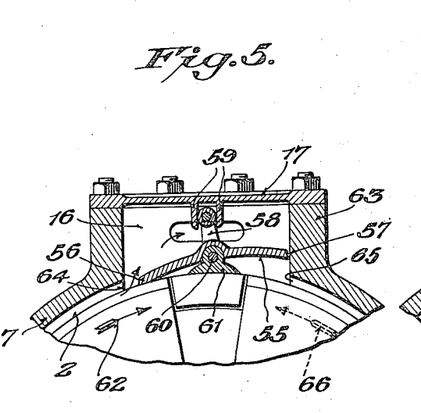

In the embodiment of the invention shown in Fig. 5, the oil-collecting means takes the form of a plate 55 having oil-collecting edges 56 and 57 at its opposite ends and provided with an upstanding arm 58, the outer end of which is adapted to engage between a pair of stationary lugs 59, shown as projecting downwardly from the cover 17. Said member 55 is pivotally mounted by means of a pintle 60 on a shoe 61 adapted to rest on the periphery of the thrust collar and move therewith through a limited distance. If the thrust collar rotates in the direction of the arrow 62 (Fig. 5), the shoe 61 rotates with the thrust collar 2 until the member 55 engages the opposed wall 63 of the chamber 16. As the outer end of the upstanding arm 58 is held stationary by the downwardly projecting lugs 59, the movement of the pivot 60 with the shoe 61 in a clockwise direction causes the member 55 to tilt about its pivot 60 until its end 56 is pressed into engagement with the peripheral surface of the thrust collar. The circumferential movement of the member 55 has, however, opened the port 64 between the chamber 16 and the portion of the annular space surrounding the oil-carrying surface at the forward or oil-collecting side of said member 55, and the latter is in proper position to collect oil from the oil-carrying surface and direct it into the chamber 16. At the same time, the member 55 has in effect closed the port 65 between the chamber 16 and the portion of the annular space surrounding the oil-carrying surface at the rear of said member 55, because communication between the chamber 16 and said portion of the annular space at the rear of the oil-collecting means is shutoff. If the thrust collar rotates in the direction of the dotted arrow 66 (Fig. 5) the shoe 59 is carried by the peripheral surface of the thrust collar until the member 55 engages the opposite side of the chamber 16. This movement causes the member 55 to tilt in the opposite direction, opening the port 65, closing the port 64 and positioning said member to collect oil from the oil-carrying surface in this direction of rotation of said surface.

Figure 6:
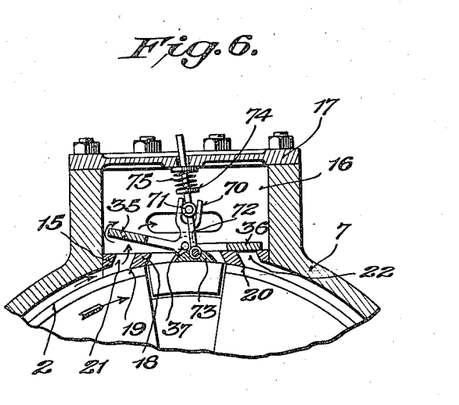

In the embodiment of the invention shown in Fig. 6, the oil-collecting means comprises a frame 15 having ports 21 and 22 as in the embodiments of the invention shown in Figs. 1 to 3. The valve mechanism also comprises connected valve members 35 and 36 as in the embodiment of Fig. 3, said valve members being pivotally mounted on the pintle 37. Said valve mechanism, however, is adapted to be moved automatically by the direction of rotation of the thrust collar and, to this end, is provided with an upstanding bifurcated arm 70 which is engaged by a pin 71 on a rod 72 which, at its lower end, is pivotally mounted on a shoe 73 which works in an aperture in the oil-collecting portion 18 of the frame 15 and rides on the periphery of the thrust collar, being adapted to be moved thereby. As the thrust collar rotates in one direction or the other, the shoe 73 is moved in the corresponding direction to tilt the connected valve members 35 and 36 to open the appropriate port for admission of oil to the chamber 16 and also simultaneously close the opposite port. In the form shown in Fig. 6, a collar 74 is mounted on the rod 72 and a coil spring 75 is interposed between said collar and the cover 17 or a collar on said rod engaged by said cover. Said spring 75 coacts with the shoe 73 to urge the same and its connected valve mechanism to extreme position as soon as said shoe has passed the dead center position. Said spring also serves to press the shoe 73 resiliently against the periphery of the thrust collar to insure that it will have sufficient friction on the latter, when said collar starts to rotate, to move with the collar and actuate the valve mechanism. Also, as in the embodiment of Fig. 4, the valve mechanism is so arranged that it will be automatically moved by the pressure of the collected oil if the shoe 73 fails to move the same.

It will therefore be perceived that a valved oil-scraper has been provided whereby the space around the oil-carrying surface at the rear of the oil collecting means may be shut off from the space around said surface at the forward or oil-collecting side of said means in whichever direction said surface may rotate. Therefore, the oil in the chamber or chambers in which the bearing members are disposed may be kept under pressure to cause rapid circulation of oil therethrough, or to force the oil through an oil-cooling device or one or more guide bearings or both. Moreover, an oil scraper has been provided with valve mechanism which may be automatically operated by the pressure of the collected oil or the direction of rotation of the oil-carrying surface or both, whereby the valve mechanism will automatically assume the proper position in accordance with the direction of rotation of the oil-carrying surface.

It will further be perceived that oil-collecting means has been provided which is adapted to collect oil from an oil-carrying surface whether said surface rotates in one direction or the other, and which has valve mechanism whereby the chamber or chambers in which the bearing members are disposed are in communication with the space around said oil-carrying surface at only the forward or oil-collecting side of said means. Furthermore, the valve mechanism of the oil-collecting means thus provided may be operated automatically by the pressure of the collected oil or the direction of rotation of the oil-carrying surface or both.

It will also be perceived that oil-collecting means has been provided which may be moved in the direction of rotation of the oil-carrying surface to shut off the space around the oil-carrying surface at the rear of the oil-collecting means from the space around said surface at the forward or oil-collecting side of said means. Also oil-collecting means has been provided which may be moved automatically by the direction of rotation of the oil-carrying surface to engage its appropriate edge with said surface for the collection of oil therefrom in accordance with the direction of rotation of said surface.

While the embodiments of the invention illustrated on the drawings have been described with considerable particularity, it is to be expressly understood that the invention is not limited thereto, as the same is capable of receiving a variety of mechanical expressions, some of which will now readily suggest themselves to those skilled in the art. Furthermore, certain features may be used without other features thereof, and changes may be made in the details of construction, arrangement, proportion and location of parts without departing from the spirit of this invention. Reference is therefore to be had to the appended claims for a definition of this invention, it being understood that the term "horizontal thrust bearing" as used therein is to be construed as generic to bearings for inclined shafts.

What is claimed is:—

1. In a horizontal thrust bearing, relatively rotatable bearing members, a housing for said bearing including an oil-retaining chamber in which said bearing members are disposed, a rotatable oil-carrying surface, and valved oil-collecting means cooperating with said oil-carrying surface and adapted to collect oil therefrom and direct it to said chamber in whichever direction said oil-carrying surface rotates, said oil-collecting means being so related to said oil-retaining chamber that a pressure is maintained on the oil therein.

2. In a horizontal thrust bearing, relatively rotatable bearing members, a housing for said bearing including a plurality of oil-retaining chambers in which said bearing members are disposed, a rotatable oil-carrying surface, and valved oil-collecting means cooperating with said oil-carrying surface and adapted to collect oil therefrom and direct it to said chambers, said oil-collecting means being so related to said oil-retaining chambers that a pressure is maintained on the oil therein.

3. In a horizontal thrust bearing, relatively rotatable bearing members, a housing for said bearing including a plurality of oil-retaining chambers in which said bearing members are disposed, a rotatable oil-carrying surface, and valved oil-collecting means cooperating with said oil-carrying surface and adapted to collect oil therefrom and direct it simultaneously to both of said chambers in whichever direction said oil-carrying surface rotates, said oil-collecting means being so related to said oil-retaining chambers that a pressure is maintained on the oil in both.

4. In a horizontal thrust bearing, relatively rotatable bearing members, a housing for said bearing including an oil-retaining chamber in which said bearing members are disposed, a rotatable oil-carrying surface, and oil-collecting means cooperating with said oil-carrying surface and adapted to collect oil therefrom and direct it to said chamber in whichever direction said oil-carrying surface rotates, said oil-collecting means comprising valve mechanism whereby said chamber is in communication with the space around said oil-carrying surface only at the oil-collecting side of said oil-collecting means in whichever direction said oil-carrying surface rotates.

5. In a horizontal thrust bearing, relatively rotatable bearing members, a housing for said bearing including a plurality of oil-retaining chambers in which said bearing members are disposed, a rotatable oil-carrying surface, and oil-collecting means cooperating with said oil-carrying surface and adapted to collect oil therefrom and direct it to said chambers, said oil-collecting means comprising valve mechanism whereby the space around said oil-carrying surface at the rear of said oil-collecting means may be closed from the space around said surface at the forward side of said oil-collecting means.

6. In a horizontal thrust bearing, relatively rotatable bearing members, a housing for said bearing including a plurality of oil-retaining chambers in which said bearing members are disposed, a rotatable oil-carrying surface, and oil-collecting means cooperating with said oil-carrying surface and adapted to collect oil therefrom and direct it simultaneously to both of said chambers in whichever direction said oil-carrying surface may rotate, said oil-collecting means comprising valve mechanism whereby both of said chambers are in communication with the space around said oil-carrying surface only at the oil-collecting side of said oil-collecting means in whichever direction said oil-carrying surface rotates.

7. In a horizontal thrust bearing, relatively rotatable bearing members, a housing for said bearing including one or more oil-retaining chambers in which said bearing members are disposed, a rotatable oil-carrying surface, and oil-collecting means cooperating with said oil-carrying surface and adapted to collect oil therefrom and direct it to said chamber or chambers, said oil-collecting means comprising automatic valve mechanism so related to said oil-carrying surface and said oil-retaining chamber or chambers that a pressure is maintained on the oil in the latter in whichever direction said oil-carrying surface rotates.

8. In a horizontal thrust bearing, relatively rotatable bearing members, a housing for said bearing including one or more oil-retaining chambers in which said bearing members are disposed, a rotatable oil-carrying surface, and oil-collecting means cooperating with said oil-carrying surface and adapted to collect oil therefrom and direct it to said chamber or chambers, said oil-collecting means comprising automatic valve mechanism whereby said chamber or chambers are in communication with the space around said oil-carrying surface only at the oil-collecting side of said oil-collecting means in whichever direction said oil-carrying surface rotates.

9. In a horizontal thrust bearing, relatively rotatable bearing members, a housing for said bearing including one or more oil-retaining chambers in which said bearing members are disposed, a rotatable oil-carrying surface, and oil-collecting means cooperating with said oil-carrying surface and adapted to collect oil therefrom and direct it to said chamber or chambers, said oil-collecting means comprising valve mechanism whereby the space around said oil-carrying surface at the rear of said oil-collecting means is automatically cut off from the space around said surface at the forward side of said oil-collecting means.

10. In a horizontal thrust bearing, relatively rotatable bearing members, a housing for said bearing including one or more oil-retaining chambers in which said bearing members are disposed, a rotatable oil-carrying surface, and oil-collecting means cooperating with said oil-carrying surface and adapted to collect oil therefrom and direct it to said chamber or chambers, said oil-collecting means being operative for either direction of rotation of said oil-carrying surface and comprising valve mechanism for shutting off the space around said oil-carrying surface at the rear of said oil-collecting means from the space around said surface at the oil-collecting side of said means.

11. In a horizontal thrust bearing, relatively rotatable bearing members, a housing for said members including one or more chambers in which said bearing members are disposed, a rotatable oil-carrying surface, oil-collecting means cooperating with said oil-carrying surface, a chamber communicating with said first-named chamber or chambers and from which the oil is directed by said oil-collecting means, said oil-collecting chamber having ports of communication with the space around the oil-carrying surface at both sides of said oil-collecting means, and valve mechanism for controlling said ports.

12. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber being adapted to communicate with the space around said oil-carrying surface at both sides of said oil-collecting means, and valve mechanism for controlling the communication of said oil-collecting chamber with said spaces at the respective sides of said oil-collecting means.

13. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve mechanism for automatically controlling said ports in accordance with the direction of rotation of said oil-carrying surface.

14. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve members for opening and closing the respective ports.

15. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve members for controlling the respective ports, and means connecting said valve members whereby one port is closed as the other is opened.

16. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve means automatically operated by the pressure of the collected oil for controlling said ports.

17. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chambers having ports of communication with the space around said oil-carrying surface at both sides of said oil-collecting means, valve mechanism for controlling said ports, and resilient means for holding said oil-collecting means on said oil-carrying surface.

18. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve mechanism operated by the direction of movement of the oil for controlling said ports.

19. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, and a chamber communicating with said first-named chamber or chambers and from which the oil is directed by said oil-collecting means, said oil collecting chamber being adapted to communicate with the space around said oil-carrying surface at both sides of said oil-collecting means and said oil-collecting means being adapted to move to control the communication with said chamber as said oil-carrying surface rotates in one direction or the other.

20. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve mechanism automatically operated by the direction of movement of said oil-carrying surface for controlling said ports.

21. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and connected valve members controlled by the direction of movement of the oil or of said oil-carrying surface for opening and closing said ports.

22. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and valve mechanism for controlling said ports automatically operated both by the pressure of the collected oil and by the direction of movement of said oil-carrying surface.

23. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve mechanism for controlling said ports, and means connected to said valve mechanism and cooperating with said oil-carrying surface whereby said valve mechanism is controlled by the direction of rotation of said oil-carrying surface.

24. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve mechanism operated by the direction of rotation of said oil-carrying surface for controlling said ports and resilient means cooperating with said valve mechanism.

25. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve mechanism for controlling said ports, and a member on which said valve member is mounted actuated by the direction of rotation of said oil-carrying surface.

26. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, and a member on which said oil-collecting means is mounted actuated by the direction of rotation of said oil-carrying surface for positioning said means in the proper oil-collecting position for the direction of rotation of said surface.

27. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, and a member on which said oil-collecting means is mounted actuated by the direction of rotation of said oil-carrying surface for positioning said means to collect oil from said surface and to control said ports in accordance with the direction of rotation of said surface.

28. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve mechanism for controlling said ports, a member cooperating with said oil-carrying surface and moved in one direction or the other as said surface rotates in one direction or the other, and connections between said member and valve mechanism whereby said valve mechanism is actuated by the movement of said member.

29. In a horizontal thrust bearing, a relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, valve mechanism for controlling said ports, and means operated by the direction of rotation of said oil-carrying surface for actuating said valve mechanism and comprising means for moving said valve mechanism to extreme position as it moves past dead-center.

30. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting chamber having ports of communication with the space around said oil-carrying surface at both sides of said oil-collecting means, connected valve members for opening and closing said ports, and a member bearing on said oil-carrying surface and operatively connected to said valve members to actuate the same to open the port at the forward side of said oil-collecting means and close the port at the rear side of said oil-collecting means as said oil-carrying surface rotates in one direction or the other.

31. In a horizontal thrust bearing, relatively rotatable bearing members, a housing for said bearing including one or more chambers in which said bearing members are disposed, a rotatable oil-carrying surface, oil-collecting means cooperating with said oil-carrying surface and adapted to collect oil therefrom in whichever direction said oil-carrying surface rotates, a chamber communicating with said first-named chamber or chambers and from which the oil is directed by said oil-collecting means, said oil-collecting means being movable by said oil-carrying surface to shut off the space around said oil-carrying surface at the rear of said oil-collecting means from said oil-collecting chamber.

32. In a horizontal thrust bearing, relatively rotatable bearing members, a housing for said bearing including one or more chambers in which said bearing members are disposed, a rotatable oil-carrying surface, and oil-collecting means cooperating with said oil-carrying surface and adapted to be moved by said surface to collect oil at one side thereof or the other as said oil-carrying surface rotates in one direction or the other.

33. In a horizontal thrust bearing, relatively rotatable bearing members, a housing for said bearing including one or more chambers in which said bearing members are disposed, a rotatable oil-carrying surface, oil-collecting means cooperating with said oil-carrying surface and movable about a transverse axis to collect oil at one side thereof or the other, and means cooperating with said oil-carrying surface to adjust said oil-collecting means in accordance with the direction of rotation of said surface.

34. In a horizontal thrust bearing, relatively rotatable bearing members, a housing for said bearing including one or more chambers in which said bearing members are disposed, a rotatable oil-carrying surface, an oil-collecting member cooperating with said oil-carrying surface, and means cooperating with said oil-carrying surface and on which said member is mounted for adjusting said member to engage the oil-carrying surface at the side toward which said surface is rotating.

35. In a horizontal thrust bearing, relatively rotatable bearing members, a housing for said bearing including one or more oil-retaining chambers in which said bearing members are disposed, a rotatable oil-carrying surface, and oil-collecting means cooperating with said oil-carrying surface and adapted to collect oil therefrom and direct it to said chamber or chambers, said oil-collecting means comprising valve mechanism adapted to automatically shut off the space around said oil-carrying surface at the rear of said oil-collecting means from the space around said surface at the forward side of said oil-collecting means.

36. Oil-collecting means comprising a member having opposed edges adapted to remove oil from an oil-carrying surface, a passage adjacent each of said edges through which the oil collected thereby may pass, and valve mechanism associated with said passages.

37. Oil-collecting means comprising a member having opposed edges adapted to remove oil from an oil-carrying surface, a passage adjacent each of said edges through which the oil collected thereby may pass, and connected valve members pivotally mounted on said first-named member and adapted to control the respective passages.

38. Oil-collecting means comprising a member having opposed edges adapted to remove oil from an oil-carrying surface, a passage adjacent each of said edges through which the oil collected thereby may pass, valve mechanism associated with said passages, and resilient means for pressing said member against the oil-carrying surface.

39. Oil-collecting means comprising a member having opposed edges adapted to remove oil from an oil-carrying surface, a passage adjacent each of said edges through which the oil collected thereby may pass, valve mechanism associated with said passages, and means connected with said valve mechanism and adapted to be moved by the oil-carrying surface for controlling said valve mechanism.

40. Oil-collecting means comprising a member having opposed edges adapted to remove oil from an oil-carrying surface, a passage adjacent each of said edges through which the oil collected thereby may pass, valve mechanism associated with said passages, means adapted to be moved by the oil-carrying surface for controlling said valve mechanism, and resilient means coacting with said valve mechanism and its controlling means.

41. In a horizontal thrust bearing, relatively rotatable bearing members, a housing for said bearing including an oil retaining chamber in which said bearing members are disposed, a rotatable oil-carrying surface, and oil-collecting means cooperating with said oil carrying surface and adapted to collect oil therefrom and direct it to said chamber, said oil-collecting means including valve mechanism whereby a pressure is maintained on the oil in said chamber.

42. In a horizontal thrust bearing, relatively rotatable bearing members, a housing for said bearing including an oil-retaining chamber in which said bearing members are disposed, a rotatable oil-carrying surface, and oil-collecting means cooperating with said oil-carrying surface and adapted to collect oil therefrom and direct it to said chamber, said oil-collecting means including valve mechanism whereby the space around said oil-carrying surface at the rear of said oil-collecting means may be shut off from said chamber.

43. In a horizontal thrust bearing, relatively rotatable bearing members, a housing for said members including one or more chambers in which said bearing members are disposed, a rotatable oil carrying surface, oil-collecting means cooperating with said oil-carrying surface, the space around said oil-carrying surface at each side of said oil-collecting means adapted to communicate with said chamber or chambers, and valve mechanism for controlling the communication of the space around said oil-carrying surface at either side of said oil-collecting means with said chamber or chambers.

44. In a horizontal thrust bearing, relatively rotatable bearing members, a housing for said members including one or more chambers in which said bearing members are disposed, a rotatable oil-carrying surface, oil-collecting means cooperating with said oil-carrying surface, the space around said oil-carrying surface at each side of said oil-collecting means adapted to communicate with said chamber or chambers, and valve mechanism operated automatically by the direction of rotation of said oil-carrying surface for controlling the communication of the space around said oil-carrying surface at either side of said oil-collecting means with said chamber or chambers.

45. In a horizontal thrust bearing, relatively rotatable bearing members, a housing for said members including one or more chambers in which said bearing members are disposed, a rotatable oil-carrying surface, oil-collecting means cooperating with said oil-carrying surface, the space around said oil-carrying surface at each side of said oil-collecting means adapted to communicate with said chamber or chambers, and valve mechanism operated automatically by the pressure of the collected oil for controlling the communication of the space around said oil-carrying surface at either side of said oil-collecting means with said chamber or chambers.

46. Oil-collecting means comprising a member having opposed edges adapted to remove oil from an oil-carrying surface and including valve mechanism controlled by the movement of said oil-carrying surface.

47. Oil-collecting means comprising a member having opposed edges adapted to remove oil from an oil-carrying surface and including valve mechanism controlled by the pressure of the collected oil.

48. Oil-collecting means comprising a member having opposed edges adapted to remove oil from an oil-carrying surface and providing valve mechanism for separating the space around said surface at one side of said means from the space around said surface at the opposite side of said means.

49. In a horizontal thrust bearing, relatively rotatable bearing members, a housing for said bearing including one or more chambers in which said bearing members are disposed, a rotatable oil-carrying surface, oil collecting means cooperating with said surface, and reversible means associated with said oil-collecting means for closing communication between said chamber or chambers and the space around said oil-carrying surface at the rear of said oil-collecting means for either direction of rotation of said oil-carrying surface.

50. In a horizontal thrust bearing, relatively rotatable bearing members, a housing for said bearing including one or more chambers in which said bearing members are disposed, a rotatable oil-carrying surface, oil-collecting means cooperating with said surface, and means automatically operated upon a change in the direction of rotation of said oil-carrying surface for closing communication between said chamber or chambers and the space around said oil-carrying surface at the rear of said oil-collecting means.

In testimony whereof I have signed this specification.

HARRY A. S. HOWARTH.